(No Model.)  J. W. MEAKER.  7 Sheets—Sheet 2.
FARE REGISTER.

No. 397,603.  Patented Feb. 12, 1889.

Witnesses:
Harry F. Jones.
Albert H. Adams.

Inventor:
John W. Meaker
By West & Bond Attys (No Model.) 7 Sheets—Sheet 3.

J. W. MEAKER.
FARE REGISTER.

No. 397,603. Patented Feb. 12, 1889.

Witnesses:
Harry T. Jones
Albert H. Adams

Inventor:
John W. Meaker
By West & Bond Attys (No Model.) 7 Sheets—Sheet 4.

J. W. MEAKER.
FARE REGISTER.

No. 397,603. Patented Feb. 12, 1889.

Witnesses:
Harry T. Jones.
Albert H. Adams.

Inventor:
John W. Meaker
By West & Bond, Attys (No Model.)   7 Sheets—Sheet 5.
J. W. MEAKER.
FARE REGISTER.
No. 397,603. Patented Feb. 12, 1889.
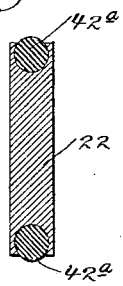
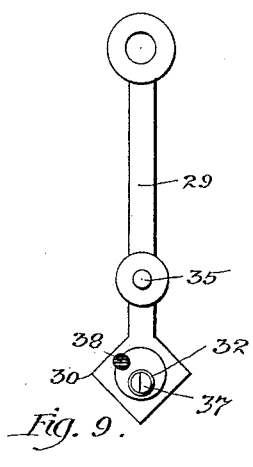
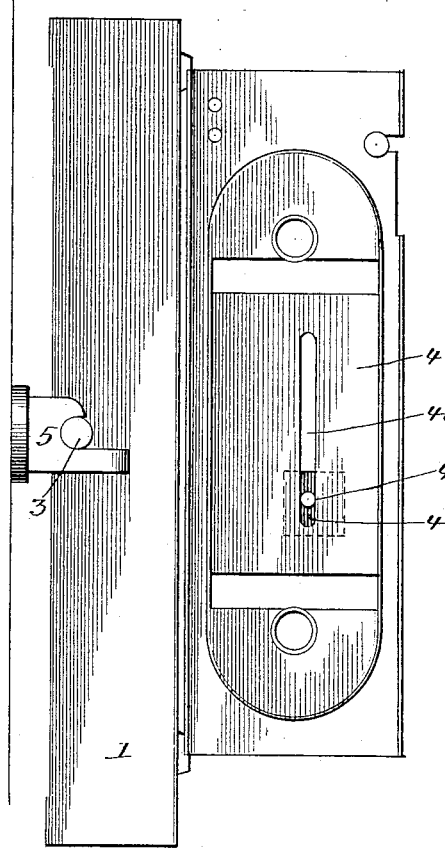
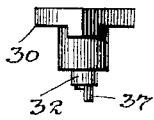
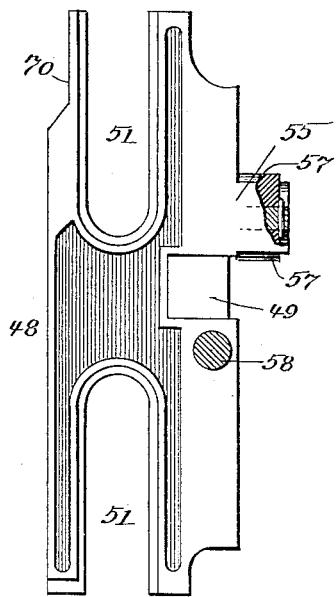
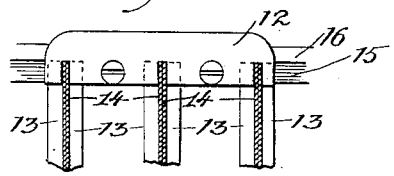
Witnesses:
Harry T. Jones
Albert H. Adams
Inventor:
John W. Meaker
By West & Bond Attys (No Model.) 7 Sheets—Sheet 6.
J. W. MEAKER.
FARE REGISTER.
No. 397,603. Patented Feb. 12, 1889.
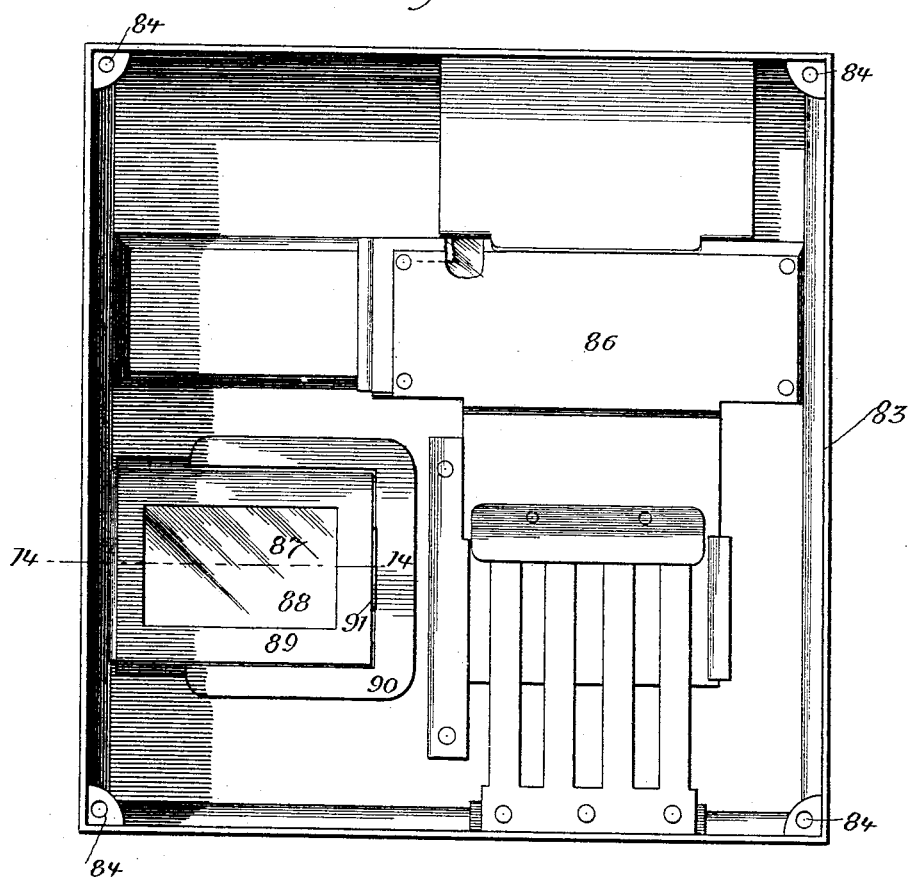
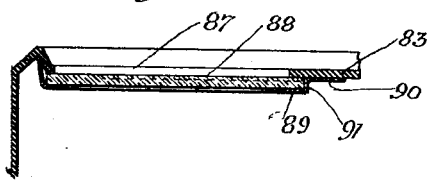

(No Model.)

7 Sheets—Sheet 7.

J. W. MEAKER.
FARE REGISTER.

No. 397,603. Patented Feb. 12, 1889.

Witnesses:
Harry T. Jones.
Albert H. Adams.

Inventor:
John W. Meaker
By West & Bond Attys.

UNITED STATES PATENT OFFICE.

JOHN W. MEAKER, OF CHICAGO, ILLINOIS, ASSIGNOR TO THE RAILWAY REGISTER COMPANY, OF SAME PLACE.

FARE-REGISTER.

SPECIFICATION forming part of Letters Patent No. 397,603, dated February 12, 1889.

Application filed July 23, 1888. Serial No. 280,782. (No model.)

*To all whom it may concern:*

Be it known that I, JOHN W. MEAKER, residing at Chicago, in the county of Cook and State of Illinois, and a citizen of the United States, have invented new and useful Improvements in Fare-Registers, of which the following is a specification, reference being had to the accompanying drawings, in which—

Figure 1:
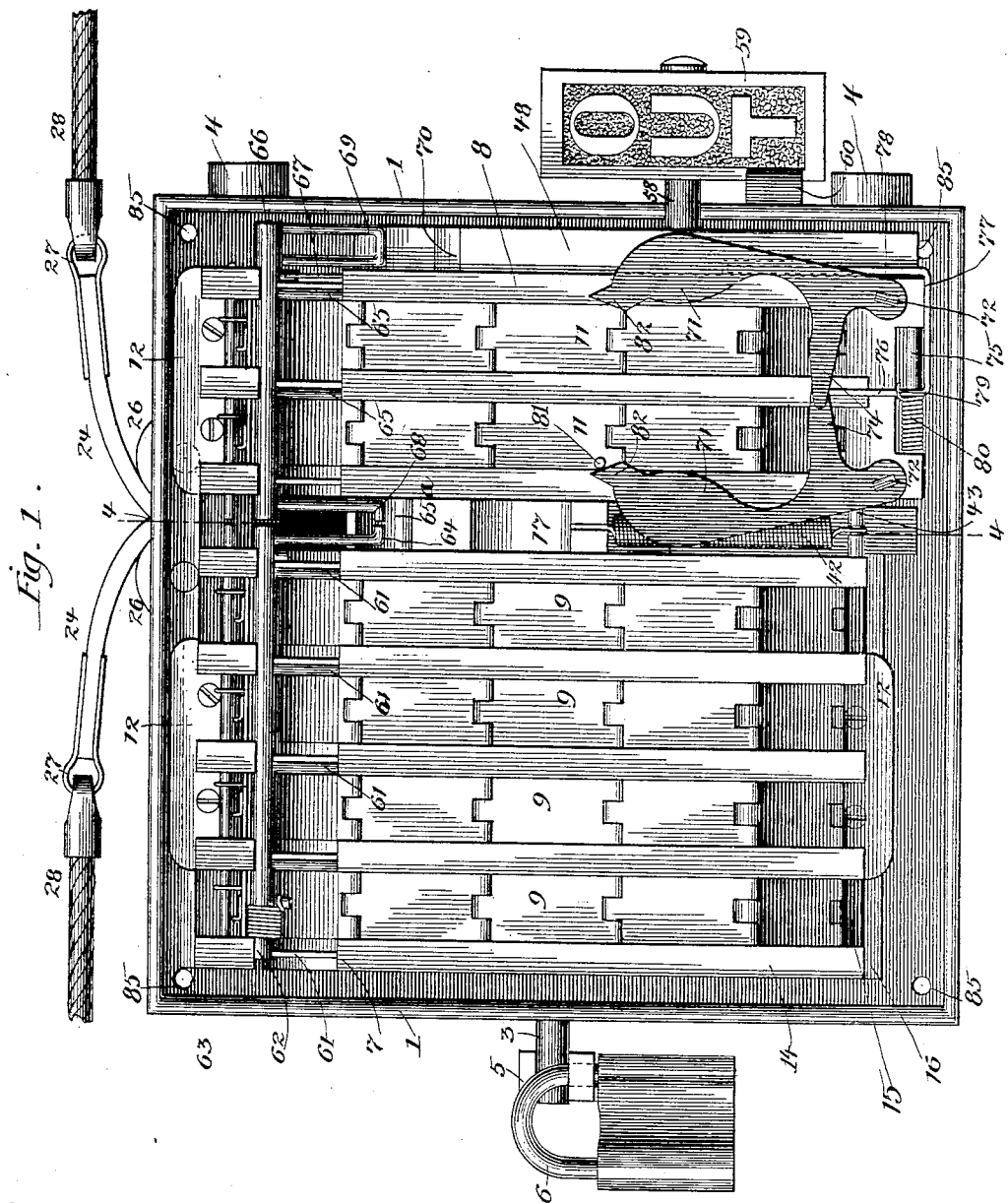
Figure 2:
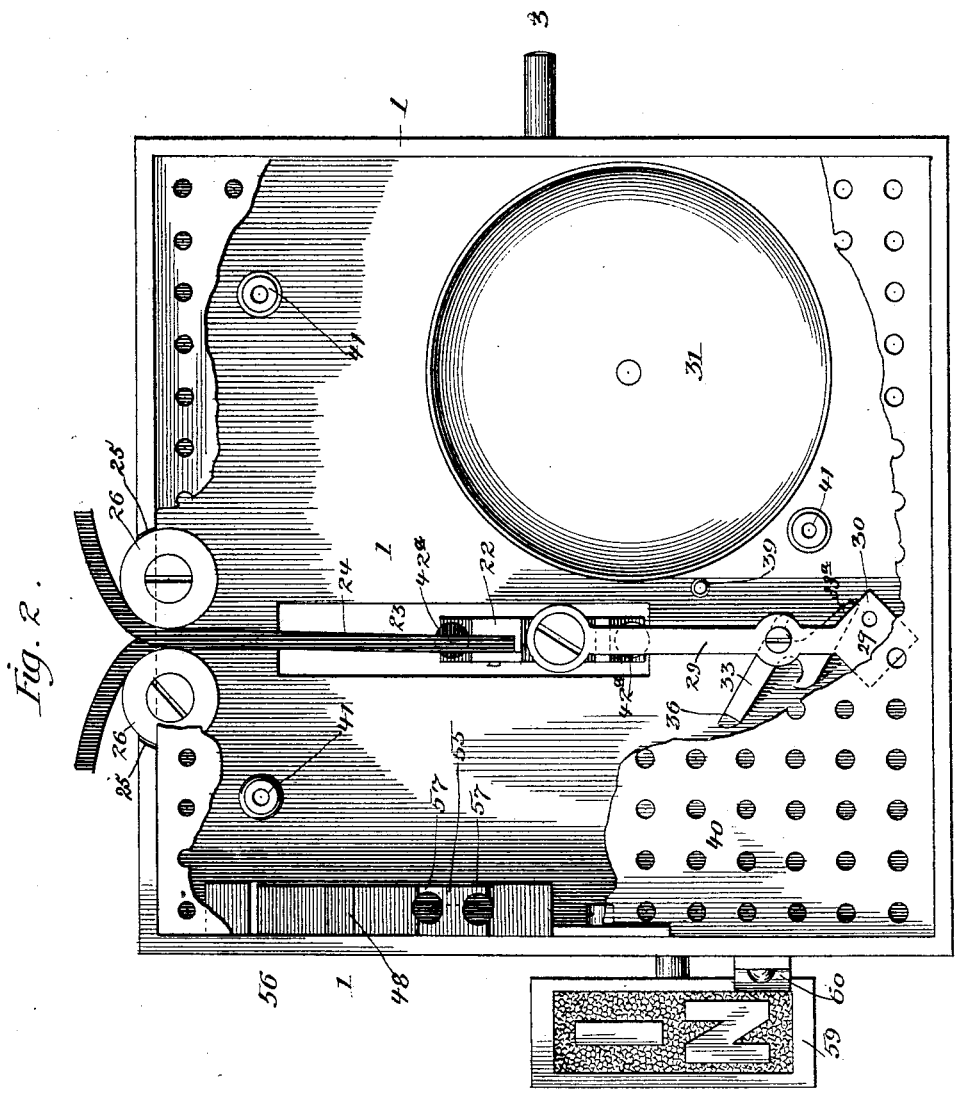
Figure 3:
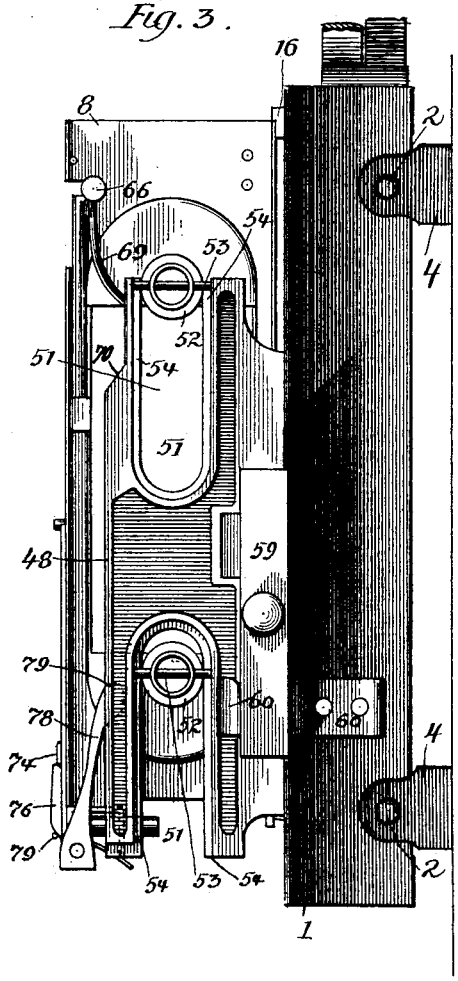
Figure 4:
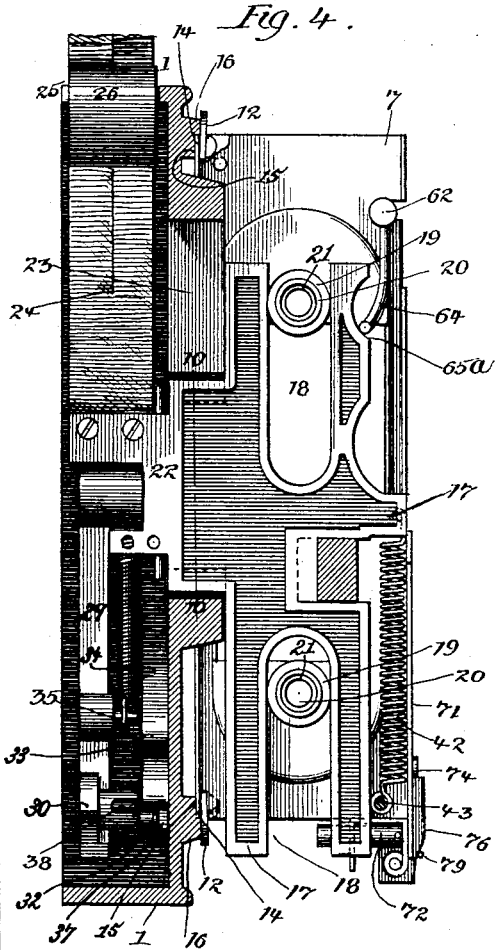
Figure 5:
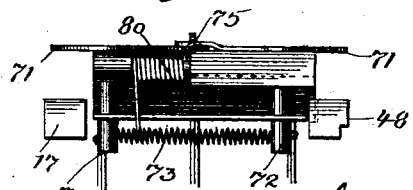
Figure 6:
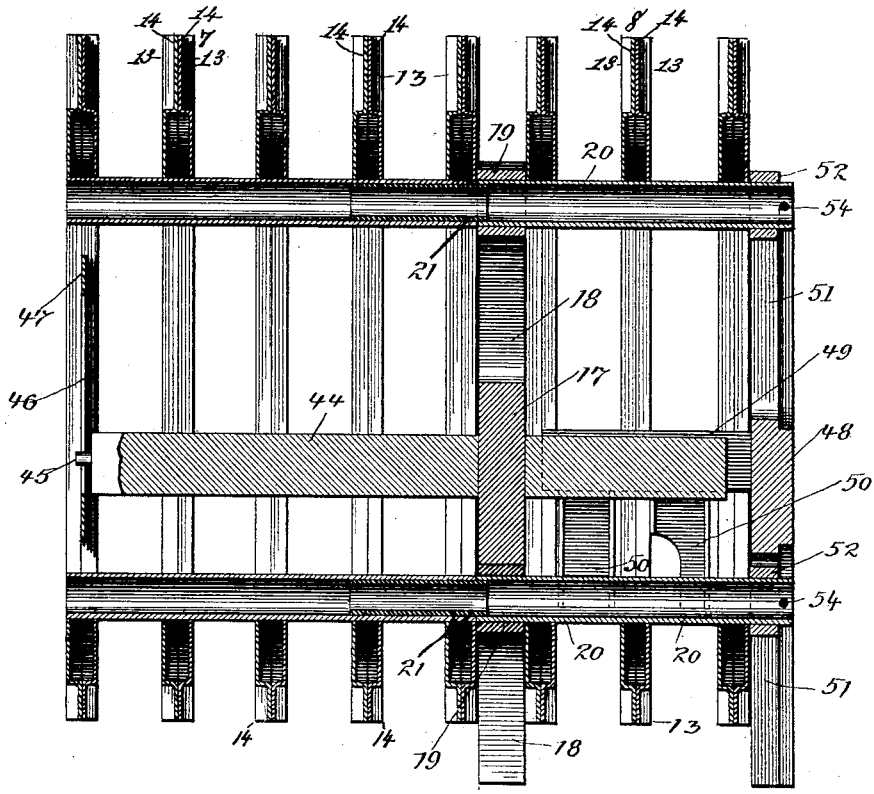
Figure 15:
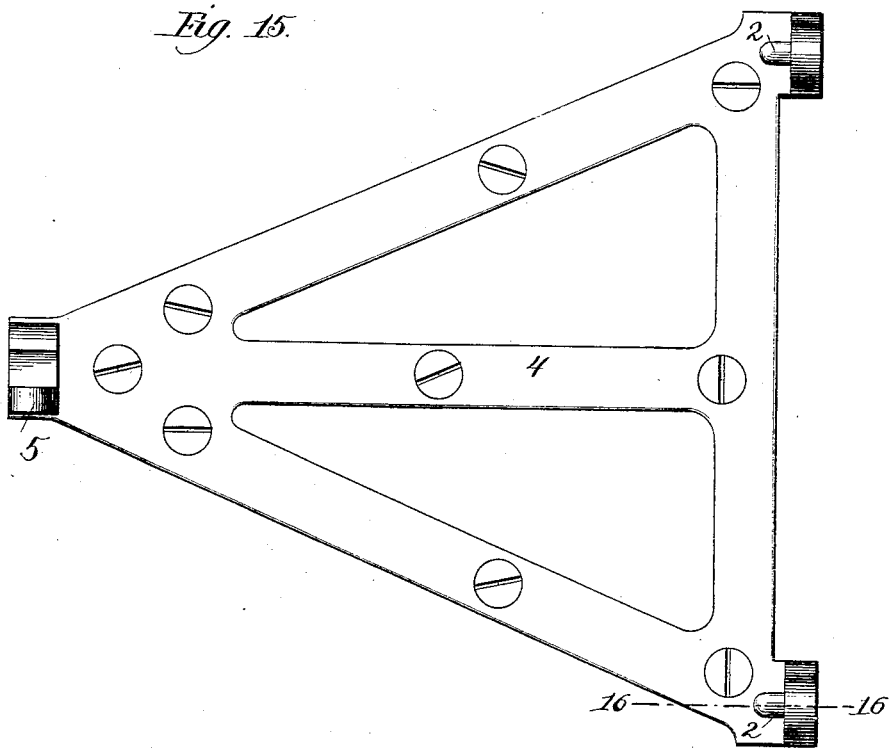
Figure 16:
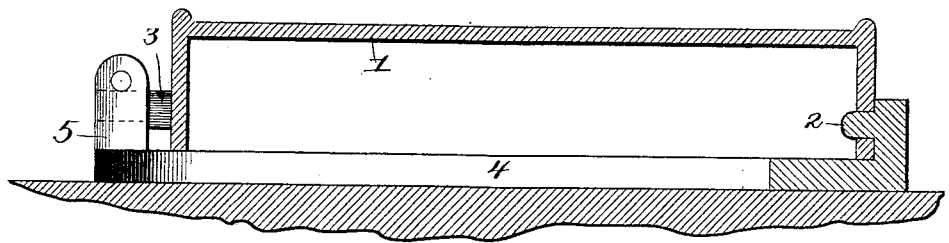

Figure 1 is a front elevation with the case removed. Fig. 2 is a rear elevation, the register being removed from its support and the rear plate being partly broken away. Fig. 3 is a side elevation of the trip-register side, the case being removed. Fig. 4 is a longitudinal section on line 4 4 of Fig. 1, looking toward the trip-register. Fig. 5 is a detail, being an end elevation of the canceling device. Fig. 6 is a longitudinal section through the center of the chain-frames. Fig. 7 is a side elevation of the total-register side, the case being removed. Figs. 8 and 9 are details, being plan and end views of the bell-hammer. Fig. 10 is a detail, being a longitudinal section of the main pull-slide at line 10 10 of Fig. 4. Fig. 11 is a detail, being a side elevation of the re-setting-slide. Fig. 12 is a detail showing the clamp for securing the chain-frame to the main frame of the register. Fig. 13 is an inside view of the case. Fig. 14 is a detail, being a section on line 14 of Fig. 13. Figs. 15 and 16 are details, being plan and edge views of the device for securing the register in position.

This invention relates to fare-registers, and is mainly designed to be used as a stationary register.

The object of this invention is to improve the construction and operation of fare-registers generally, but more especially to improve the register shown and described in my application, Serial No. 261,230, filed January 19, 1888.

The nature of the invention consists in the several improvements hereinafter described, and illustrated in the drawings.

That which I claim as new will be pointed out in the claims.

In the drawings, 1 represents the main frame of the register, which is cast or formed in one piece in the form shown in Figs. 2 and 16. This frame is secured to a plate, 4, Figs. 15 and 16, by means of two pins, 2, on one side, which enter holes in the frame 1, and a bar, 3, on the opposite side, which is held in a staple, 5, by a padlock, 6, Fig. 1. The plate 4 is secured to the wall of the car, Fig. 16, by screws, Fig. 15, or otherwise, so that the main frame will cover the means of fastening. By this means the register is secured firmly in place in the car.

7 in Fig. 6 represents a frame for supporting the chains 9 of the total-register, and 8, Fig. 6, represents a frame for supporting the chains 11 of the trip-register. These frames 7 and 8 are constructed substantially as heretofore, and are secured to the main frame 1 by clamping-plates 12, Figs. 1 and 12.

As shown in Figs. 4 and 12, the vertical walls 13 of the chain-frames 7 and 8 have flanges or lips 14, which rest on a chamfer, 15, in the supporting-pieces 16, secured on the main frame 1. The clamping-plates 12 are notched to receive the vertical walls 13 of the chain-frames 7 and 8, and are secured to the supporting-pieces 16 by screws, Fig. 12. The rear edges of the clamping-plates rest on the supporting-pieces 16, and the front edges press against the flanges 14 of the chain-frames, clamping them firmly on the chamfer of the supporting-piece 16.

The main pull-slide 17, Fig. 4, is formed with a slot, 18, in each end, in which are rollers 19, which are mounted on tubes 20, secured in the trip-register chain-frame 8. The total-register chain-frame 7 is secured in proper relative position with the trip-register chain-frame by means of tubes 21, secured in the total-register chain-frame, whose external diameters equal the internal diameters of the tubes 20, so as to fit within the said tubes 20, as shown in Fig. 6, uniting the two frames 7 and 8 into a single frame with the main pull-slide between them.

The rollers 19 in the slots 18 guide the movements of the slide 17 and form an anti-friction support for the slide 17. The sides of the frames 7 and 8 form guides for the slide 17.

The main pull-slide 17 has a projection, 22, which passes through a slot, 23, in the main frame 1, as shown in Fig. 4. To this projection 22 is attached the pull-strap 24, which passes through an opening, 25, Fig. 2, in the main frame 1, between two anti-friction rollers 26, secured in the main frame 1. The pull-strap 24 is divided into two parts of equal length, each having a loop, 27, to which the car-ropes 28 are secured. The two divisions or parts of the pull-strap 24 are of equal length, so that they can be attached to one car-rope, 28, when it is desired to employ a single car-rope without changing the register. On the opposite side of the projection 22 from the strap 24 and in direct line therewith is pivoted the bell-hammer 29. The head of the hammer 29 has a point, 30, to strike against a bell, 31, and is provided with an anti-friction roller, 32, mounted on a pin, 37, to run on a stepped cam, 33, secured to the rear side of the main frame 1. A coiled spring, 34, is secured to a pin, 35, on the bell-hammer 29 and to the projection 22, which acts to keep the bell-hammer 29 in direct line with the pull-strap 24 and projection 22, forcing the anti-friction roller against the stepped cam 33.

When the main pull-slide 17 is pulled upward, the anti-friction roller runs on the stepped cam 33, swinging the hammer away from the bell until the last point or step of the cam is reached. This step has a notch, 36, into which the roller passes, allowing the pin 37 to engage with the cam 33. The pin 37 is cut away, so as to have a sharp edge, as shown in Figs. 8 and 9, and the cam 33 is pointed, as shown in Fig. 2, so that when the roller 32 has entered the notch 36 the pin 37 will engage with the cam 33 until it passes the point of the cam 33, when it will leave the cam without dragging and the hammer will strike the bell with a quick sharp blow. The cam 33 has its steps on one side of the vertical path of the hammer, and, being inclined upward, these steps not only prevent the return of the hammer in the same path, but the lower step when once passed prevents its returning at all until the complete action is effected. When this is done and the bell is struck, the hammer automatically returns, riding over the lower ends of the steps of said cam 33 and over a tail-piece, 33$^a$, which is carried with a downward inclination somewhat to the opposite side, as seen in Fig. 2, to insure the return of the roller 32 beneath the inclined steps. The bell-hammer which engages with the cam, being in direct line with the pull-strap 24, prevents any binding or twisting of the parts of the main pull from a sudden pull or release, and the spring 34 being in line with the hammer acts to return it to that line when moved out of line by the cam 33. The steps on the cam necessitate a complete movement of the bell-hammer and main pull-slide.

The head of the hammer 29 has a piece of rubber, 38, secured in it in such position that when the hammer has struck the bell once a small movement of the hammer longitudinally in returning will cause the rubber 38 to strike a pin, 39, secured in the main frame 1 near the bell 31, preventing any rebounding of the hammer against the bell and the consequent double ringing with one registration.

The bell-chamber of the main frame is covered by a perforated plate, 40, which is riveted or otherwise secured to three posts, 41, which are secured to or cast with the main frame and are arranged in triangular form, as shown in Fig. 2. This means of supporting the plate prevents any vibrations which would injure the tone of the bell.

The projection 22 of the main pull-slide 17 has a rubber buffer, 42$^a$, as shown in Figs. 2 and 10, secured in each end to strike the ends of the slot 23, thus limiting the movements of the slide 17 and preventing any shock or jar.

When the slide 17 is pulled upward to its limit of motion and the tension on the pull-strap 24 is released, the slide will be returned to its normal position by gravity; but to insure its return a coiled spring, 42, is secured at one end to a pin, 43, in the chain-frame and at its other end to the slide 17.

To the main pull-slide 17 is secured a cross-bar, 44, which carries the usual pawls (not shown) for advancing the chains of both the total and the trip registers. The construction and operation of the pawls and chains are the same as that shown and described in my said application No. 261,230.

The end of the cross-bar 44, which carries the pawls for operating the total-register, is of considerable length and consequently liable to bind in its movements. To prevent binding or twisting, a pin, 45, is provided in its end, which slides in a slot, 46, in a plate, 47, secured in the outer end of the total-register chain-frame, as shown in Fig. 7, thereby securing a direct movement of the outer end of the cross-bar 44.

The trip-register consists of a units and a tens chain, which are reset to zero at the end of a trip by a slide, 48, which supports a bar, 49, carrying pawls 50, for moving the trip-chains, as shown and described in my said former application.

The resetting-slide 48, Fig. 2, is provided with a slot, 51, in each end, in which run supporting and guiding rollers 52, (see Figs. 3, 6, and 11,) which are mounted on the tubes 20 of the trip-register chain-frame 8. These rollers are secured in place by pins 53, which pass through a hole in the outer ends of the tubes 20, and are held against withdrawal by the projecting edges 54 of the resetting-slide 48. These pins are inserted before the chain-frame 8 is secured to the main frame 1, when the slide 48 can be moved longitudinally, so that the centers of the tubes 20 will come outside of the slots 51, permitting the insertion of the pins 54, Fig. 6.

The slide 48 is provided with a projection, 55, Figs. 2 and 11, which slides in a slot or opening, 56, in the main frame 1. This projection 55 is provided with two buffers, 57, which form a cushioned limit-stop for the slide 48 by striking against the ends of the slot 56 like the cushioned limit-stops for the main pull-slide already described.

The slide 48 is moved by a rod or bar, 58, which projects through a slot in the case and has pivoted on its outer end a direction-indicating plate, 59. When the direction-indicating plate 59 and the resetting-slide 48 are in their normal positions, the indicating-plate is held against rotation by a guide, 60; but when the slide 48 and plate 59 are at their opposite limit of motion, the edge of the plate 59 is disengaged from the guide 60, so that the plate can be turned to indicate the opposite direction of travel.

The chains 9 of the total register are held against improper advancement by stop-fingers 61, secured to a rock-shaft, 62, mounted in a chain-frame, 7. The fingers are held in contact with the chain-links, as usual, by a spring, 63, on the rock-shaft 62. The rock-shaft is rocked so as to throw the fingers 61 out of engagement with the chains 9 by an arm, 64, which engages with a cam, 65$^a$, on the main pull-slide 17, as shown and described in my former application.

The trip-register chains 11 are held against improper advancement by stop-fingers 65, which are secured to a rock-shaft, 66, mounted in the trip-chain frame 8, Fig. 1. The fingers 65 are held in contact with the links of the trip-chains by a spring, 67, which presses down on an arm of the rock-shaft. The rock-shaft 66 is rocked so as to throw the fingers 65 out of engagement with the chains 11 either by an arm, 68, which engages with a cam, 65$^a$, on the main pull-slide 17, Fig. 1, or by an arm, 69, which engages with a cam, 70, on the resetting-slide 48, Figs. 1 and 3. By this construction the fingers 61 and 65 are raised by the arms 64 and 68, when the main pull-slide is advanced, allowing both the total and the trip register chains to be advanced. When the trip-chains are reset to zero by the resetting-slide 48, only the fingers 65 for the trip-register chains are raised by the arm 69, which engages with the cam 70 on the resetting-slide 48, thus allowing the trip-chains to be reset to zero, while the total-register chains are held against advancement.

In order to insure a resetting to zero of the trip-chains at the end of the trip and prevent a fraudulent manipulation of the trip-register by the setting-pull, I employ cancelers for the trip-chains, as heretofore; but I operate these cancelers by improved devices.

The cancelers 71 are each secured on a rock-shaft, 72, mounted in a frame secured to the trip-register chain-frame 8. These shafts 72, at their inner ends, are connected by a coiled spring, 73, as shown in Fig. 5, which acts to turn the rock-shafts 72 inward and throw the cancelers 71 across the trip-chains 11. The cancelers 71 have arms 74, which project inward, the arm 74 of the cancelers for the units-chain being extended laterally, so as to pass over that of the tens-chain. When the cancelers are in their normal position, as shown in Fig. 1, they are held against being thrown across the chains 11 by the spring 73, Fig. 5, by means of the projecting arms 74, which are held by a movable stop, 76, Fig. 1, which is pivoted on a bar, 75, secured in the chain-frame 8 and pressed down by a coiled spring, 80, as shown in Figs. 1 and 5. The lower end of the arm 76 is secured to or made integral with a cross-bar, 77, which projects beyond the chain-frame 8, and has secured to it an arm, 78, the end of which rests in a notch, 79, on the resetting-slide 48 when the parts are in their normal position, as in Fig. 3.

At the end of a trip, when it is desired to reset the trip-chains to zero, the chains are advanced by the resetting-slide 48, as heretofore. The first movement of the slide raises the end of the arm 78 out of the notch 79, which rocks the arm 77 and raises the stop-arm 76, and thereby releases the cancelers 71, which are thrown across the trip-register chains by the spring 73, the projecting arms 74 passing under the stop-arm 76. The trip-chain links which have on their faces the number 9 in use are the ones that have a pin, 81, near their lower ends to engage with the cam 82 on the upper end of the cancelers 71, as in Fig. 1. When the chains are reset to zero, the pins 81 engage with the cams 82 and move the cancelers back out of sight and the arms 74 forward, allowing the stop-arm 76 to drop behind them, thus holding the cancelers in their retracted positions, as shown in Fig. 1, until again released, as already described.

When the tens-chain is reset to zero before the units-chain, the pin 81 will hold the tens-canceler out of contact until the units-chain is reset to zero, when the stop-arm will drop behind both of the arms 74, the arm 76 resting on the projecting arm 74 of the units-canceler until the units-chain is reset to zero. When the units-chain is reset to zero before the tens-chain, the arm 76 drops behind the projecting arm 74 of the units-canceler and rests on the projecting arm 74 of the tens-canceler until it is reset to zero, when the arm 76 drops behind the projecting arm 74, holding both cancelers out of contact.

When the units-canceler is over the units-chain and the tens-chain is at zero, and the pin 81 holds the tens-canceler out of sight, the canceler of the units-chain cannot be removed by the main pull without releasing the tens-canceler, because the pin 81 releases the tens-canceler before the pin 81 of the units-chain moves the units-canceler back sufficiently to allow the stop-arm 76 to drop behind the projecting arms 74, so that the arm 76 rests on the arm 74 of the tens-canceler, thereby preventing the removal of both of the cancelers, except by the resetting-slide or when the main pull advances the chains from 99 to 100.

The operation of the register is like that of my former patents, except as to the several parts herein particularly described, the leading features of the register as a whole being the same.

The case 83, Fig. 13, which covers the front of the register, is secured to the main frame 1 by screws, which pass through holes 85, Fig. 1, in the main frame 1 and lugs 84 in the corners of the case 83, the heads of the screws being on the rear side of the main frame 1, so that the case cannot be removed without removing the register from its place. The front of the case (not shown) is like that heretofore used. It is provided with a sight-opening, 86, for the total-register, and a sight-opening, 87, for the trip-register, as usual, the total-register sight-opening 86 being provided with a sliding cover like that shown in my patent dated June 22, 1886, No. 344,126.

The sight-opening 87 is covered by a glass, 88. This glass 88 is held over the sight-opening 87 by a frame, 89, and is inserted under the frame 89 by sliding it under the inner end of the frame 89, and held against retraction by a metal spring-plate, 90, of the form shown in Fig. 13, which is secured at its ends to the case 83. This spring is a three-sided rectangular plate partly surrounding the sight-opening. The front edge of the plate 90 has a lip, 91, which closes the end of the frame 89. The ends only of the spring-plate 90 being secured to the case 83, the plate 90 can be sprung up to allow the glass 88 to pass between it and the case, and it will spring back to place when released, thus holding the glass in the frame 89.

What I claim as new, and desire to secure by Letters Patent, is—

1. The combination, with the main frame, registering-chains, and chain-actuating mechanism of a fare-register, of a supporting-piece, 16, having a chamfer, 15, the chain-frames having flanges 14, seated on the chamfer, and the clamping-plates 12, secured to the chamfered piece and bearing against the flanges of the chain-frames, substantially as described.

2. The combination, with the frame and the numeral-bearing devices of a fare-register, of a main pull-slide, 17, located in the frame, and a pull-strap, 24, divided longitudinally into parts of equal length, each extending into the frame through an opening and connected to said slide, substantially as described.

3. The combination, in a fare-register, of a main frame having an opening, 25, numeral-bearing chains, and chain-frames, of a guided main pull-slide, 17, for actuating the chains, and a pull-strap, 24, divided longitudinally into two parts of equal length, each extending into the frame through said opening and secured to the said slide, substantially as described.

4. The combination, in a fare-register, of the bell and the main pull-slide 17, having a pull-strap connected with one side thereof, a bell-hammer secured to the slide in a direct line with the pull-strap, and a stepped cam, 33, located in a direct line with the bell-hammer and pull-strap, and with which cam the bell-hammer engages in said direct line, substantially as described.

5. The combination, with the bell, the main pull-slide, and the pull-strap of a fare-register, of a stepped cam and a bell-hammer connected with the slide in a direct line with the pull-strap and stepped cam said strap acting in direct line with said bell-hammer and cam, substantially as described.

6. The combination, in a fare-register having a bell, of a main pull-slide, 17, provided with a bell-hammer, 29, having a friction-roller, 32, and a beveled pin, 37, and the stepped cam 33, having a notch, 36, to receive the roller and permit the pin to engage the cam, substantially as described.

7. The combination, in a fare-register having a bell, of a fixed stop-pin, 39, located near the bell, a main pull-slide, and a bell-hammer, 29, carrying an attached cushion, 38, which strikes the stop-pin on the return movement of the slide and prevents the hammer rebounding and double ringing the bell on a single registration, substantially as described.

8. The combination, in a fare-register, of a main pull-slide, 17, a bell-hammer having a pin, 37, roller 32, and cushion 38, a stepped cam, 33, having a notch, 36, a bell, 31, and a stop-pin, 39, near the bell, substantially as described.

9. The combination, with the frame of a fare-register having a guide-slot, 23, and the registering-chains, of a slide for actuating the chains, having a lateral guiding projection, 22, extending into the slot and provided at each end with a buffer to strike the ends of the slot and limit the motion of the slide, substantially as described.

10. The combination, in a fare-register, of the total-registering chains, the main pull-bar having a cam, a rock-shaft having stop-fingers for the total-chains and an arm to engage with the cam, the trip-register chains, the resetting-slide having a cam, and a second rock-shaft having stop-fingers for the trip-register chains, an arm to engage the cam on the main pull-slide, and an arm to engage the cam on the resetting-slide, whereby the chains for both registers may be simultaneously operated for counting and the trip-register separately released for resetting, substantially as described.

11. The combination, with the registering-chains, of the chain-frame, the tubes secured in the chain-frame, the rollers mounted on the tubes, the locking-pins passing through the tubes, and the slide moving on the rollers and having overhanging edges which prevent the withdrawal of the pins, substantially as described.

12. The combination, with the registering-chains and chain-actuating mechanism of a fare-register, of the canceler 71, having the projections 74, the spring for throwing the cancelers across the chains, the resetting-slide, and a stop-arm, 76, actuated by the resetting-slide to release the cancelers, substantially as described.

13. The combination, with the registering-chains and chain-actuating mechanism of a fare-register, of the canceler 71, having the projections 74, the spring 73, the stop-arm 76, the cross-bar 77, having the arm 78, and the resetting-slide 48, having a notch, 79, to receive the end of the arm on said cross-bar when the parts are in normal position, substantially as described.

14. The combination, with the registering-chains and chain-frame of a fare-register, of a main pull-slide, 17, having a cross-bar, 44, provided with a pin, 45, and a plate, 47, secured in the chain-frame and having a slot, 46, receiving the end of said pin to secure a correct movement of the outer end of the cross-bar, substantially as described.

15. A fare-register composed of a main frame containing the registering mechanism and provided with a front case, 83, having a sight-opening, 87, containing a glass, 88, the surrounding frame 89, holding the glass, and the spring-plate 90, having the lip 91, closing one end of the said surrounding frame, substantially as described.

16. A fare-register comprising a main frame provided with the registering-chains and their actuating mechanism, and having the projecting bar 3 at one side and two holes at the opposite side, and the base-plate 4, having a staple, 5, receiving said pin, and two pins, 2, entering said holes, substantially as described.

JOHN W. MEAKER.

Witnesses:
    WM. W. BONNETT,
    WM. W. WHITE.